US009509597B2

(12) United States Patent
Narayanan et al.

(10) Patent No.: US 9,509,597 B2
(45) Date of Patent: *Nov. 29, 2016

(54) SYSTEM AND METHOD FOR DATAPLANE EXTENSIBILITY IN A FLOW-BASED SWITCHING DEVICE

(71) Applicant: Dell Products, LP, Round Rock, TX (US)

(72) Inventors: Rajesh Narayanan, San Jose, CA (US); Padmavathi V. Uppalapati, San Jose, CA (US); Saikrishna M. Kotha, Austin, TX (US); Geng Lin, Cupertino, CA (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,945

(22) Filed: Mar. 24, 2015

(65) Prior Publication Data

US 2015/0195193 A1 Jul. 9, 2015

Related U.S. Application Data

(63) Continuation of application No. 13/762,845, filed on Feb. 8, 2013, now Pat. No. 9,009,349.

(51) Int. Cl.
*G06F 15/16* (2006.01)
*H04L 12/721* (2013.01)

(52) U.S. Cl.
CPC .................... *H04L 45/38* (2013.01)

(58) Field of Classification Search
CPC ...................................... H04L 45/38
See application file for complete search history.

(56) References Cited

U.S. PATENT DOCUMENTS

| 6,678,283 | B1 * | 1/2004 | Teplitsky ............... H04L 45/00 370/463 |
| 6,779,039 | B1 | 8/2004 | Bommareddy et al. |
| 7,339,929 | B2 * | 3/2008 | Zelig ................... H04L 12/1836 370/390 |
| 8,116,310 | B2 * | 2/2012 | Boers ...................... H04L 45/00 370/389 |
| 8,559,307 | B2 * | 10/2013 | Mangione-Smith ................. G06F 15/7825 370/231 |
| 8,750,106 | B2 | 6/2014 | Saito |

(Continued)

OTHER PUBLICATIONS

"Split Plane Architecture, Building the Next-Generation Packet Infrastructure," © 2000 Network Equipment Technologies, Inc., 2000 http://www.at2.com/downloads/documents/all_others/net_splitplane_architecture_wp.pdf.

(Continued)

*Primary Examiner* — Moustafa M Meky
(74) *Attorney, Agent, or Firm* — Larson Newman, LLP

(57) ABSTRACT

A network switching device includes a macroflow sub-plane that performs packet-based routing, a microflow routing module that performs flow-based routing, and a software defined network (SDN) agent. The microflow routing module includes a packet processing module and a virtual port, and is operable to determine that the packet processing module is to be utilized to process a flow, direct the flow to the packet processing module via the virtual port in response to determine that the packet processing module is to be utilized to process the flow, process the flow using the packet processing module, and direct the flow to a destination associated with the flow. The SDN agent sends a port status message to a SDN controller indicating that the microflow routing module includes the virtual port and that the virtual port is associated with the packet processing module.

17 Claims, 3 Drawing Sheets

(56) References Cited

U.S. PATENT DOCUMENTS

| | | | |
|---|---|---|---|
| 8,774,205 B2 | 7/2014 | Miyazaki et al. | |
| 8,856,518 B2 * | 10/2014 | Sridharan | H04L 45/586 713/162 |
| 9,009,349 B2 * | 4/2015 | Narayanan | H04L 45/38 370/360 |
| 2005/0152284 A1 | 7/2005 | Kotha et al. | |
| 2006/0112219 A1 | 5/2006 | Chawla et al. | |
| 2007/0266110 A1 | 11/2007 | Chawla et al. | |
| 2008/0040376 A1 | 2/2008 | Reeves et al. | |
| 2008/0288664 A1 | 11/2008 | Pettey et al. | |
| 2009/0049160 A1 | 2/2009 | Cherian et al. | |
| 2009/0112877 A1 | 4/2009 | Cherian et al. | |
| 2009/0135722 A1 * | 5/2009 | Boers | H04L 45/00 370/236 |
| 2009/0144463 A1 | 6/2009 | Cherian et al. | |
| 2009/0164769 A1 | 6/2009 | Cherian et al. | |
| 2009/0165097 A1 | 6/2009 | Cherian et al. | |
| 2009/0232137 A1 | 9/2009 | Cherian et al. | |
| 2009/0327675 A1 | 12/2009 | Cherian et al. | |
| 2010/0057908 A1 | 3/2010 | Smith et al. | |
| 2010/0077066 A1 | 3/2010 | Chawla et al. | |
| 2010/0138642 A1 | 6/2010 | Cherian et al. | |
| 2010/0146039 A1 | 6/2010 | Lo et al. | |
| 2010/0165877 A1 | 7/2010 | Shulka et al. | |
| 2010/0180274 A1 | 7/2010 | Cherian et al. | |
| 2011/0161626 A1 * | 6/2011 | Mangione-Smith | G06F 15/7825 712/29 |
| 2012/0042095 A1 | 2/2012 | Kotha et al. | |
| 2012/0263186 A1 | 10/2012 | Ueno | |
| 2013/0016617 A1 | 1/2013 | Nishikawa | |
| 2013/0061047 A1 * | 3/2013 | Sridharan | H04L 45/586 713/162 |
| 2014/0229630 A1 | 8/2014 | Narayanan et al. | |

OTHER PUBLICATIONS

"OpenFlow: Enabling Innovation in Campus Networks," McKeown et al., Mar. 14, 2008 http://www.openflowswitch.org.

"SPARC—Split Architecture Introduction," Andreas Gladisch, Deutsche Telekom AG, T-Labs, SPARC Introduction, Brussels Concertation Meeting, Oct. 2010 http://cordis.europa.eu/fp7/ict/future-networks/documents/projects-sparc-presentation_en.pdf.

U.S. Appl. No. 13/596,564, filed Aug. 28, 2012.

U.S. Appl. No. 13/408,444, filed Feb. 29, 2012.

* cited by examiner

SYSTEM AND METHOD FOR DATAPLANE EXTENSIBILITY IN A FLOW-BASED SWITCHING DEVICE

CROSS REFERENCE TO RELATED APPLICATIONS

This application is a continuation of U.S. patent application Ser. No. 13/762,845 entitled "System and Method for Dataplane Extensibility in a Flow-based Switching Device," filed on Feb. 8, 2013, the disclosure of which is hereby expressly incorporated by reference in its entirety.

FIELD OF THE DISCLOSURE

The present disclosure generally relates to information handling systems, and more particularly relates to dataplane extensibility in a flow-based switching device in a network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
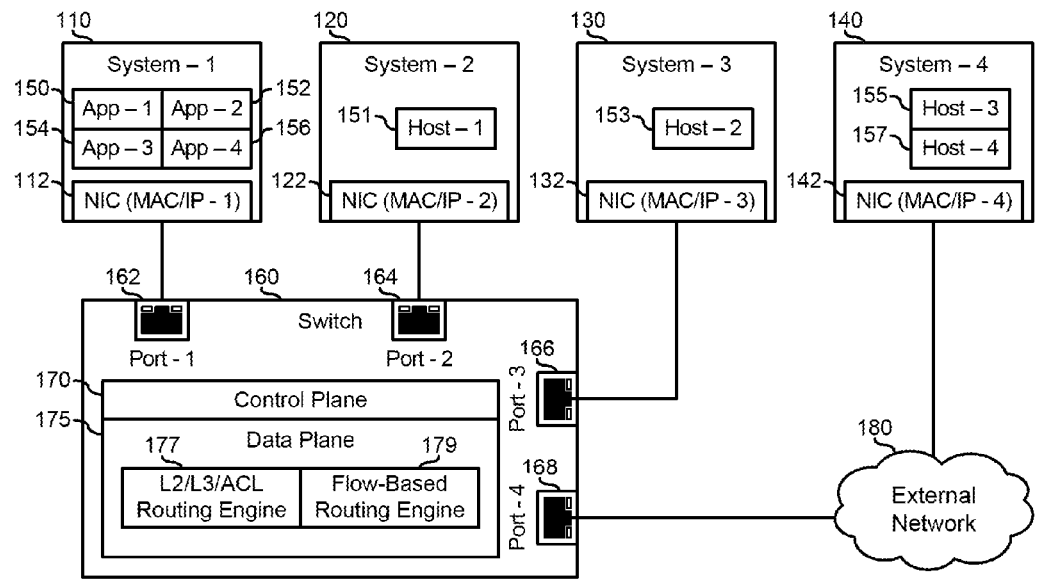
FIG. 1 is a block diagram of a network according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Network 100 includes networked systems 110, 120, 130, and 140, a flow-based switching device 160, and an external network 180. Systems 110, 120, 130, and 140 represent a variety of computing resources of network 100 including client information handling systems, data processing servers, network storage devices, local and wide area networks, or other resources as needed or desired. System 110 includes a network interface card (NIC) 112, system 120 includes a NIC 122, system 130 includes a NIC 132, and system 140 includes a NIC 142. NICs 112, 122, 132, and 142 represent network adapters that are operable to provide a data interface to transmit and receive data between the respective systems 110, 120, 130, and 140. As such, NICs 112, 122, 132, and 142 can represent add-in cards, network interfaces that are integrated with a main board of respective systems 110, 120, 130, and 140, another network interface capability, or a combination thereof. Each of NICs 112, 122, 132, and 142 are uniquely identified on network 100 via one or more unique identifiers. For example, NICs 112, 122, 132, and 142 can each be identified by one or more of a media access control (MAC) address, an Internet protocol (IP) address, a world wide name (WWN), or another unique identifier, as needed or desired.

Systems 110, 120, 130, and 140 are adapted to run one or more applications 150, 152, 154, and 156, or to run associated host applications 151, 153, 155, and 157. Thus, as illustrated, system 110 is running applications 150, 152, 154, and 156, system 120 is running host application 151 that is associated with application 150, system 130 is running host application 153 that is associated with application 152, and system 140 is running host application 155 that is associated with application 154 and host application 157 that is associated with application 156. For example, application 150 can represent an electronic mail client application that is associated with host application 151 that represents an electronic mail server, application 152 can represent a data storage client application that is associated with host application 153 that represents a data storage server, application 154 can represent a web browser application that is requesting web data from host application 155 that represents a hosted website, and application 156 can represent streaming multimedia content that is associated with host application 157 that represents a streaming multimedia server.

Flow-based switching device 160 includes ports 162, 164, 166, and 168. Switching device 160 operates to route data packets between ports 162, 164, 166, and 168. As such, switching device 160 receives data packets from ports 162, 164, 166, and 168, determines the destination for the data packets, and sends the data packets to the port that is associated with the destination. Port 162 is connected to NIC 112, port 164 is connected to NIC 122, port 166 is connected to NIC 132, and port 168 is connected via external network 180 to NIC 142. As such, data packets received from system 110 on port 162 will be directed to port 164, 166, or 168, based upon whether the data packets are destined for system 120, 130, or 140. Data packets from systems 120, 130, and 140 will similarly be directed to appropriate port 162, 164, 166, or 168.

Switching device 160 includes a control plane 170 and a data plane 175. Control plane 170 represents a central processing unit (CPU) complex and operates to provide network discovery, mapping, and management based upon various protocols, and provides for differentiated service within switching device 160. For example, control plane 170 can perform network discovery and mapping based upon a shortest path first (SPF) or open shortest path first (OSPF) protocol, a peer-to-peer protocol (PPP), a neighbor discovery protocol (NDP), a border gateway protocol (BGP), or another network mapping and discovery protocol. Control plane 110 can also provide network management based upon a simple network management protocol (SNMP), a trivial file transfer protocol (TFTP), a Telnet session, or another network management protocol.

Data plane 175 performs the routing functions of switching device 160 by receiving data packets from ports 162, 164, 166, and 168, determining the destination for the data packets, and sending the data packets to the port that is associated with the destination. The routing functions can be packet-based or flow-based. As such, data plane 175 includes a packet-based routing engine 177 and a flow-based routing engine 179. Packet-based routing engine 177 provides for routing behavior that is determined based upon the port that receives the data packets and a determination of the port to which the data packets are to be forwarded. For example, packet-based routing engine 177 can provide for routing based upon the Open Systems Interconnect (OSI) model for layer 2 and layer 3 data packet routing. Here, packet-based information is determined based upon header information of the data packets. For example, the header information can include a source MAC address, a source IP address, a destination MAC address, a destination IP address, another type of data packet header information, or a combination thereof. As such, packet-based routing engine 177 can include a routing table that associates certain destination addresses with the respective ports 162, 164, 166, and 168 that are used to forward the data packets.

Table 1 illustrates an example of a packet-based routing table for network 100. Here NIC 112 has a MAC address of 12:34:56:78:9a:bc, and an IP address of 000.111.001, NIC 122 has a MAC address of de:f0:12:34:56:78, and an IP address of 000.111.002, and NIC 132 has a MAC address of ab:12:cd:34:ef:56, and an IP address of 000.111.003. Data packets received by switching device 160 on ports 164, 166, or 168, and that have header information that includes the MAC address or the IP address for NIC 112, will be routed to port 162. Similarly, data packets received that have header information that matches the MAC address or the IP address for NICs 122 and 132 will be routed to ports 164 and 166, respectively. In a particular embodiment, packet-based routing engine 177 provides for routing behavior that is determined based upon other packet-based rules, such as those determined by an access control list (ACL), a firewall, a filter, another packet-based rule, or a combination thereof. In another embodiment, the packet-based routing table includes other fields for layer 2, layer 3, and ACL routing, as needed or desired.

TABLE 1

| Packet-Based Routing Table | | |
| --- | --- | --- |
| Port Number | MAC Address | IP Address |
| 1 | 12:34:56:78:9a:bc | 000.111.001 |
| 2 | de:f0:12:34:56:78 | 000.111.002 |
| 3 | ab:12:cd:34:ef:56 | 000.111.003 |
| 4 | — | All Other |

Flow-based routing engine 179 provides for routing behavior that is determined based upon the particular flow of information with which the data packets are associated. A flow is a sequence of data packets sent from a particular source to a particular unicast, anycast, or multicast destination that the source desires to label as a flow, and can consist of all data packets in a specific transport connection or media stream. For example, a flow can be associated with a particular application, a user, a media stream, another flow identifier, or a combination thereof, as needed or desired. Flow-based routing engine 179 performs deep packet inspection to determine whether or not data packets received from servers 110, 120, 130, or 140 are associated with a flow. As such, flow-based routing engine 179 can include flow routing rules, a flow routing table, other flow control mechanisms, or a combination thereof, in order to ascertain that a certain data packet is associated with a flow, and to thereby determine a port 162, 164, 166, or 168 to which to forward the data packets.

Table 2 illustrates an example of a flow-based routing table for network 100. Here in addition to the MAC address and IP address routing associations, the table includes each identified flow, and the associated egress port, application, and user. Here, when a deep packet inspection of the data packets indicates that the data packets are associated with one of the identified flows, the data packet is routed to the associated port 162, 164, 166, or 168. For example, if a data packet is identified as being a data packet associated with an e-mail from a first user that is being sent to an e-mail server, then the data packet will be routed to the host e-mail server 151 on system 120. When host e-mail server 151 provides data packets back to the first user, the deep packet inspection of the data packet will reveal that the data packet is associated with flow—6, and the data packet will be routed via port 162 to e-mail application 150 on server 110. In a particular embodiment, flow-based routing engine 179 provides for routing behavior that is determined based upon other data packet information, such as those determined by tuple inspection of the data packets, another flow-based rule, or a combination thereof. In another embodiment, the flow-based routing table includes other fields for flow-based routing, as needed or desired.

TABLE 2

Flow-Based Routing Table

| Port Number | MAC Address | IP Address | Application | Destination | User | Flow ID |
|---|---|---|---|---|---|---|
| 1 | 12:34:56:78:9a:bc | 000.111.001 | App. - 1 | Port 2 | 1 | 1 |
|  |  |  |  |  | 2 | 2 |
|  |  |  | App. - 2 | Port 3 | — | 3 |
|  |  |  | App. - 3 | Port 4 | — | 4 |
|  |  |  | App. - 4 | Port 4 | — | 5 |
| 2 | de:f0:12:34:56:78 | 000.111.002 | Host App. - 1 | Port 1 | 1 | 6 |
|  |  |  |  |  | 2 | 7 |
| 3 | ab:12:cd:34:ef:56 | 000.111.003 | Host App. - 2 | Port 1 | All | 8 |
| 4 | — | All Other | Host App. - 3 | Port 1 | All | 9 |
|  |  |  | Host App. - 4 | Port 1 | 1 | 10 |
|  |  |  |  |  | 2 | 11 |

Figure 2:
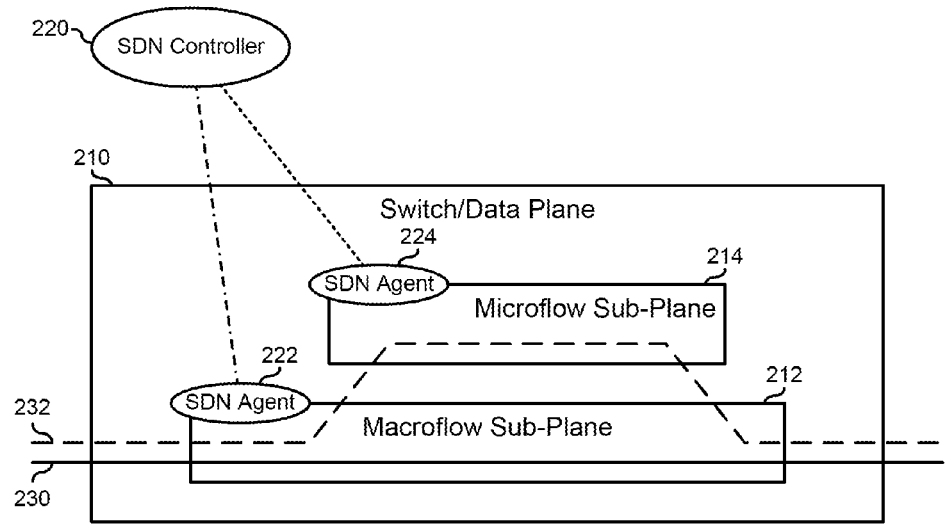
FIG. 2 is a block diagram of a flow-based switching device according to an embodiment of the present disclosure.

FIG. 2 illustrates a network 200 similar to network 100, including a flow-based switching device 210 and a software defined network (SDN) controller 220. Switching device 210 is similar to switching device 160, and has a split data plane including a macroflow sub-plane 212 and a microflow sub-plane 214. Macroflow sub-plane 212 operates similarly to packet-based routing engine 177, and microflow sub-plane 214 operates similarly to flow-based routing engine 179. In a particular embodiment, macroflow sub-plane 212 represents an application specific integrated circuit (ASIC) that is suitable to receive data packets on a port of switching device 210, and to quickly make routing decisions for the data packets using packet-based routing techniques as described above. For example, macroflow sub-plane 212 can be implemented via readily available, low cost, commercial ASIC product that is adapted to provide efficient packet-based routing.

In a particular embodiment, microflow sub-plane 214 represents a processing capability of switching device 210 that is suitable to receive data packets on a port of switching device 210, and to quickly make routing decisions for the data packets using flow-based routing techniques as described above. For example, microflow sub-plane 214 can be implemented as a multi-core processing complex that is able to rapidly make multiple processor-intensive flow-based routing decisions, such as a network processing unit (NM. The split data plane thus provides an adaptable, scalable solution to increased flow-based traffic on network 200.

SDN controller 220 provides visibility into the switching paths of the network traffic through macroflow sub-plane 212 and microflow sub-plane 214, and permits the switching paths to be modified and controlled remotely. SDN controller 220 establishes a link with macroflow sub-plane 212 via an SDN agent 222 that operates on switching device 210, and establishes a link with microflow sub-plane 214 via an SDN agent 224 that operates on the switching device. SDN agents 222 and 224 permit secure communications between the SDN controller 210 and sub-planes 212 and 214. An example of an SDN includes a network that is controlled by an OpenFlow protocol, or another flow-based switching network instantiated in software. In a particular embodiment, switching device 210 operates to support virtual port addressing on macroflow sub-plane 212, on microflow sub-plane 214, or on both, as needed or desired.

Macroflow sub-plane 212 receives and routes data packets 230 and 232. As illustrated, macroflow sub-plane 212 receives both data packets 230 and 232. Macroflow sub-plane 212 determines if the data packets are able to be routed based upon the packet-based rules implemented by the macroflow sub-plane. If so, microflow sub-plane 212 routes the data packets. For example, data packets 230 represent a group of data packets that can be routed based upon the packet-based rules, and data packets 230 are shown as transiting switching device 210 through only macroflow sub-plane 212. However, if the data packets are not able to be routed based upon the packet-based rules implemented by macroflow sub-plane 212, or if the data packets otherwise require further classification based upon a deep packet inspection, the data packets are sent to microflow sub-plane 214, and the microflow sub-plane routes the data packets. For example, data packets 232 represent a group of data packets that cannot be routed based upon the packet-based rules, and data packets 232 are shown as transiting switching device 210 through both macroflow sub-plane 212 and microflow sub-plane 214.

Figure 3:
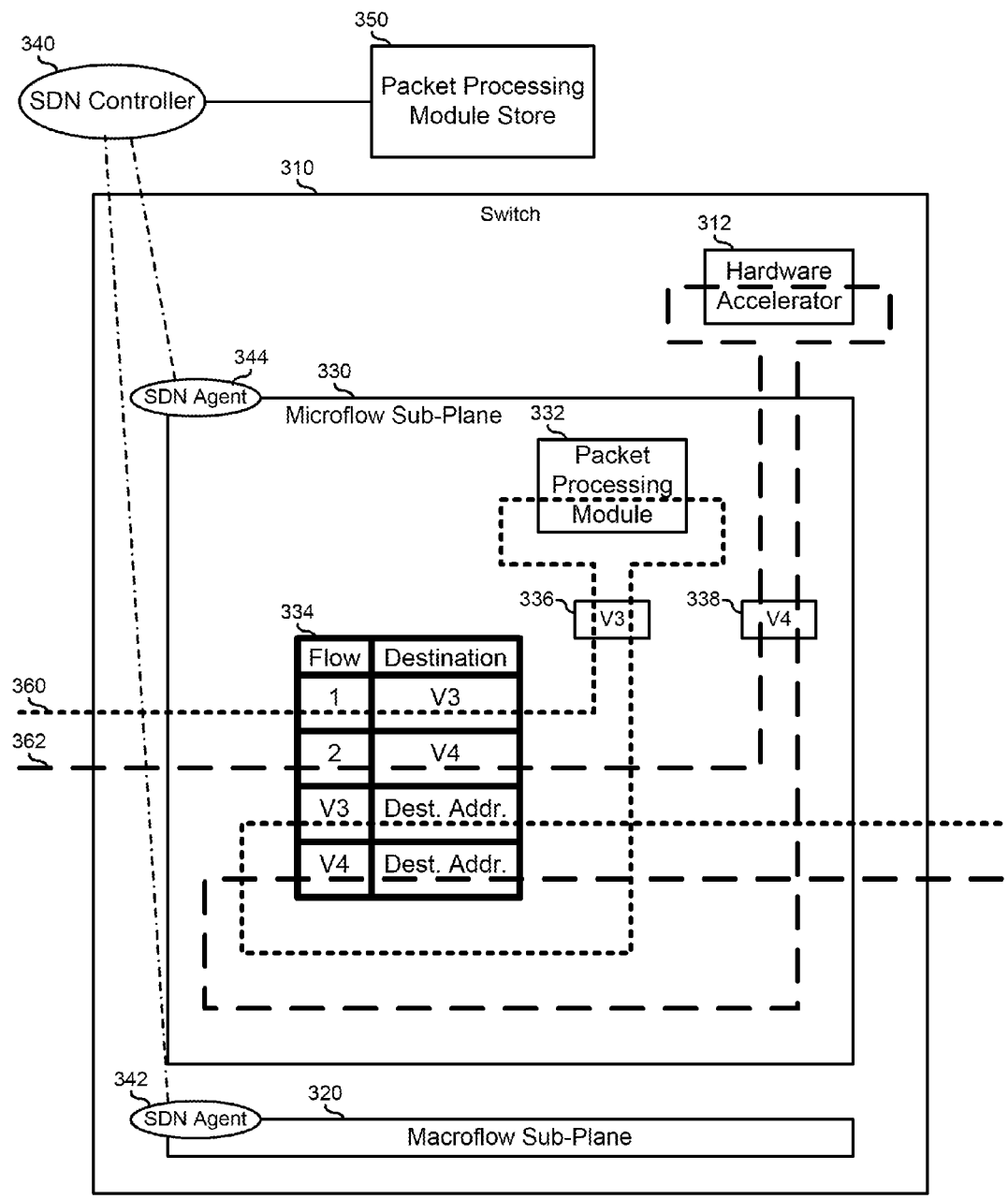
FIG. 3 is a block diagram of a flow-based switching device according to another embodiment of the present disclosure.

FIG. 3 illustrates a network 300 similar to network 200, including a flow-based switching device 310, a SDN controller 340, and a packet processing module store 350. Switching device 310 is similar to switching device 210, and has a split data plane including a macroflow sub-plane 320 and a microflow sub-plane 330. Switch 310 includes a hardware accelerator 312. Microflow sub-plane 330 includes a packet processing module 332, a flow table 334, and virtual ports 336 and 338. Macroflow sub-plane 320 operates similarly to Macroflow sub-plane 320, and microflow sub-plane 330 operates similarly to microflow sub-plane 214. In a particular embodiment, macroflow sub-plane 320 represents an application specific integrated circuit (ASIC) that is suitable to receive data packets on a port of switching device 310, and to quickly make routing decisions for the data packets using packet-based routing techniques as described above, and microflow sub-plane 330 represents a processing capability of switching device 310 that is suitable to receive data packets on a port of switching device 310, and to quickly make routing decisions for the data packets using flow-based routing techniques as described above. SDN controller 340 provides visibility into the switching paths of the network traffic through macroflow sub-plane 320 and microflow sub-plane 330, and establishes links with the macroflow sub-plane via an SDN agent 342, similar to SDN agent 222, and with the microflow sub-plane via an SDN agent 344, similar to SDN agent 224. The routing of data packets through macroflow sub-plane 320 is similar to the routing of data packets through macroflow sub-plane 212 and the routing of data packets from the macroflow sub-plane to microflow sub-plane 330 is similar to the routing of data packets to microflow sub-plane 214, as described above.

Switching device 310 provides for in-flow data packet processing extensions. Here, in addition to the flow routing rules, flow routing table, other flow control mechanisms for the routing of data packets within microflow sub-plane 330, further processing on the data packets is performed by hardware accelerator 312 included in switch 310, and by packet processing module 338 in the microflow sub-plane. Hardware accelerator 312 represents a processing capability that is included with switch 310, and can be implemented on the switch as dedicated hardware circuitry, firmware operating on the switch to provide the acceleration functionality, or a combination thereof. As such, hardware accelerator 312 can be provided by the manufacturer of switch 310 at the time of manufacture, or can be an updated functionality through firmware updates or the like. An example of the functionality provided by hardware accelerator 312 includes a virtual private network (VPN), a packet encryption engine, a packet compression engine, a firewall, an intrusion prevention and detection system (IPDS) functionality, payload pattern matching, key lookup, bit field manipulation, another functionality provided with switch 310, or a combination thereof. Packet processing module 332 represents similar functionality as can be provided by hardware accelerator 312, but where the functionality is added to microflow sub-plane 330. For example, packet processing module 332 can be loaded into a memory of an NPU on microflow sub-plane 330. In a particular embodiment, the functions of hardware accelerator 312 and of packet processing module 332 are activated based upon data packet processing extensions that are defined by a particular specification, such as the OpenFlow Switch Specification, or another open network specification. In this embodiment, particular tags or markers in the data packets can be identified which initiate the processing of the data packets of a particular flow by hardware accelerator 312 and by packet processing module 332. Note that in a particular embodiment, packet processing module 332 can include some or all of the functions of hardware accelerator 312, as needed or desired.

In another embodiment, the functions of hardware accelerator 312 and of packet processing module 332 are activated based upon flow routing. A method of activating hardware accelerator 312 and packet processing module 332 based upon flow routing is shown here, when a flow 360 is identified that is to utilize the functionality of packet processing module 332, a flow entry is created in flow table 334 that associates the flow with virtual port 336, and that associates the virtual port with a continuation of the routing of the flow to the desired destination for the flow. Here, when data packets are received at switch 310 that are associated with flow 360, the data packets are directed to microflow sub-plane 330, and flow table 334 directs that the data packets be routed in microflow sub-plane 330 to virtual port 336, and the data packets are processed by packet processing module 332. The processed data packets of flow 360 are routed back through virtual port 336 and the processed data packets are directed to the destination address associated with the flow. Similarly, when a flow 362 is identified that is to utilize the functionality of hardware accelerator 312, a flow entry is created in flow table 334 that associates the flow with virtual port 338, and that associates the virtual port with a continuation of the routing of the flow to the desired destination for the flow. Here, when data packets are received at switch 310 that are associated with flow 362, the data packets are directed to microflow sub-plane 330, and flow table 334 directs that the data packets be routed in microflow sub-plane 330 to virtual port 338, and the data packets are processed by hardware accelerator 312. The processed data packets of flow 362 are routed back through virtual port 338 and the processed data packets are directed to the destination address associated with the flow.

Note that as illustrated, a single virtual port 336 is associated with packet processing module 332, and a single virtual port 338 is associated with hardware accelerator 312, that the virtual ports are bi-directional, and that when processed data packets are returned from the packet processing module or the hardware accelerator, the processed data packets are processed as flow entries in flow table 334 that are associated with the virtual ports. In another embodiment, packet processing module 332 and hardware accelerator 312 are each associated with a pair of virtual ports, one for ingress into the functional space of the respective elements, and one for egress from the functional space. Here, a flow table similar to flow table 334 would include flow entries associated with the egress ports for further routing of the respective flows. In another embodiment, packet processing module 332 and hardware accelerator 312 are each associated with multiple virtual ports, each of which is accessed as a destination associated with a different flow. In this way, the functions of packet processing module 332 and of hardware accelerator 312 can be sequentially accessed by a particular flow. For example, a flow entry can direct data packets to a third virtual port associated with packet processing module 332, a flow entry in flow table 334 that is associated with the third virtual port can direct data packets to a fourth virtual port associated with hardware accelerator 312, and a flow entry in the flow table that is associated with the fourth virtual port can direct the data packets to the destination address associated with the flow.

When virtual ports 336 and 338 are instantiated on microflow sub-plane 330, SDN agent 344 sends a port status message to SDN controller 340, informing the SDN controller of the presence of the virtual ports on the microflow sub-plane. In addition to indicating the presence of virtual ports 336 and 338, the port status message includes metadata informing the SDN controller of the functionality associated with packet processing module 332 and with hardware accelerator 312. In a particular embodiment, SDN controller 340 is connected to SDN agents in one or more additional switches similar to switch 310. Here, each switch can advertise the virtual ports created thereon, and the added processing functionality that is associated with each virtual port. Moreover, SDN controller 340 can manage routing through the network of switches that includes switch 310 and the one or more additional switches, such that, when a flow is detected that needs to utilize the functionality of one or more of packet processing module 332 and hardware accelerator 312, the flow can be routed to switch 310 for processing by the packet processing module or the hardware accelerator, as needed. In addition, SDN controller 340 can operate to perform load balancing between the switches of the network. For example, if the number of flows in the network that need to utilize the functionality of packet processing module 332 or hardware accelerator 312 is high, SDN controller 340 can operate to load balance the flows such that any one switch is not over-utilizing its associated packet processing module or hardware accelerator.

SDN controller 340 also operates to provide packet processing module 332 to switch 310 from packet processing module store 350. Here, packet processing module store 350 operates to retain one or more packet processing modules similar to packet processing module 332. Here, packet processing module store 350 can include a packet processing module development system where new functions and features are developed for the packet processing modules prior to being loaded to switch 310. Moreover, in a particular embodiment SDN controller 340 retrieves one or more packet processing module from packet processing module store 350 and loads the modules onto switch 310 and the one or more additional switches in the network.

Figure 4:
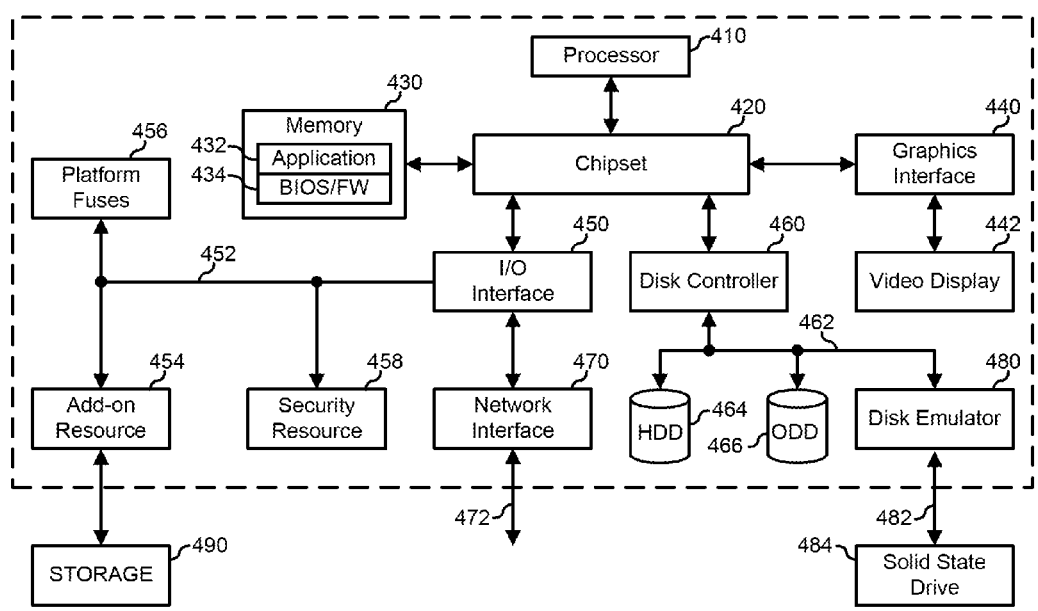
FIG. 4 is a block diagram illustrating an information handling system according to an embodiment of the present disclosure.

FIG. 4 is a block diagram illustrating an embodiment of an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment, information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays, such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network switching device comprising:
   a macroflow sub-plane that performs packet-based routing in the network switching device; and
   a microflow routing module that performs flow-based routing in the network switching device, the microflow routing module including a first packet processing module, a first virtual port, a second packet processing module, and a second virtual port, wherein the microflow routing module:
   directs a first flow to the first packet processing module via the first virtual port in response to determining that the first packet processing module is to be utilized to process the first flow;
   processes the first flow using the first packet processing module;
   directs the first flow to a destination associated with the first flow;
   directs the second flow to the second packet processing module via the second virtual port in response to determining that the second packet processing module is to be utilized to process the second flow;
   processes the second flow using the second packet processing module; and
   directs the second flow to a destination associated with the second flow.

2. The network switching device of claim 1, wherein:
   the microflow routing module further includes a second virtual port and the microflow routing module further:
   directs the second flow to the first packet processing module via the second virtual port in response to determining that the first packet processing module is to be utilized to process the second flow;
   processes the second flow using the first packet processing module; and
   directs the second flow to a destination associated with the second flow.

3. The network switching device of claim 1, further comprising:
   a hardware accelerator;
   wherein the microflow routing module further includes a second virtual port and the microflow routing module further:
   direct the second flow to the hardware accelerator via the second virtual port in response to determining that the hardware accelerator is to be utilized to process the second flow;

processes the second flow using the hardware accelerator; and directs the second flow to a destination associated with the second flow.

4. The network switching device of claim 3, wherein:
the microflow routing module further includes a third virtual port and a fourth virtual port, and the microflow routing module further:
directs the third flow to the first packet processing module via the third virtual port in response to determining that the first packet processing module is to be utilized to process the third flow;
processes the third flow using the first packet processing module;
directs the third flow to the hardware accelerator via the fourth virtual port in response to processing the third flow using the first packet processing module;
processes the third flow using the hardware accelerator; and
directs the third flow to a destination associated with the third flow.

5. The network switching device of claim 1, wherein the first packet processing module is received by the microflow routing module from Software Defined Network (SDN) controller via the SDN agent.

6. The network switching device of claim 1, wherein the first virtual port comprises an ingress virtual port for providing the first flow to the first packet processing module and an egress virtual port for receiving the processed first flow from the first packet processing module.

7. The network switching device of claim 1, wherein the microflow routing module further includes a flow table operable to direct the first flow to the first virtual port, and direct the processed first flow to the destination associated with the first flow.

8. The network switching device of claim 1, wherein the first packet processing module operates to provide at least one of data packet encryption and data packet compression.

9. A method comprising:
directing, by a microflow routing module of a network switching device, a first flow to a first packet processing module of the microflow routing module via a first virtual port of the microflow routing module in response to determining that the first packet processing module is to be utilized to process the first flow;
processing the first flow using the first packet processing module;
directing the first flow to a destination associated with the first flow;
directing, by the microflow routing module, a third flow to the first packet processing module via a third virtual port of the microflow routing module in response to determining that the first packet processing module is to be utilized to process the third flow;
processing the third flow using the first packet processing module;
directing the third flow to the hardware accelerator via the fourth virtual port of the microflow routing module in response to processing the third flow using the first packet processing module;
processing the third flow using the hardware accelerator; and
directing the third flow to a destination associated with the third flow.

10. The method of claim 9, further comprising:
directing, by the microflow routing module, a second flow to the first packet processing module via a second virtual port of the microflow routing module in response to determining that the first packet processing module is to be utilized to process the second flow;
processing the second flow using the first packet processing module; and
directing the second flow to a destination associated with the second flow.

11. The method of claim 9, further comprising:
directing, by the microflow routing module, a second flow to the second packet processing module via a second virtual port of the microflow routing module in response to determining that the second packet processing module is to be utilized to process the second flow;
processing the second flow using the second packet processing module; and
directing the second flow to a destination associated with the second flow.

12. The method of claim 9, further comprising:
directing, by the microflow routing module, a second flow to a hardware accelerator via a second virtual port of the microflow routing module in response to determining that the hardware accelerator is to be utilized to process the second flow;
processing the second flow using the hardware accelerator;
directing the second flow to a destination associated with the second flow.

13. The method of claim 9, wherein the first virtual port comprises an ingress virtual port for providing the first flow to the first packet processing module and an egress virtual port for receiving the processed first flow from the first packet processing module.

14. The method of claim 9, wherein the first packet processing module operates to provide at least one of data packet encryption and data packet compression.

15. A non-transitory computer-readable medium including code for performing a method, the method comprising:
directing a first flow to a first packet processing module of a microflow routing module via a first virtual port of the microflow routing module in response to determining that the first packet processing module is to be utilized to process the first flow;
processing the first flow using the first packet processing module;
directing the first flow to a destination associated with the first flow;
determining that a hardware accelerator of the network switching device is to be utilized to process a second flow;
directing, by the microflow routing module, a second flow to a hardware accelerator via a second virtual port of the microflow routing module in response to determining that the hardware accelerator is to be utilized to process the second flow;
processing the second flow using the hardware accelerator; and
directing the second flow to a destination associated with the second flow.

16. The computer-readable medium of claim 15, the method further comprising:
directing, by the microflow routing module, a second flow to the first packet processing module via a second virtual port of the microflow routing module in response to determining that the first packet processing module is to be utilized to process the second flow;

processing the second flow using the first packet processing module; and directing the second flow to a destination associated with the second flow.

17. The computer-readable medium of claim 15, the method further comprising:

debuggerdetermining, by the microflow routing module, that a second packet processing module is to be utilized to process a second flow;

directing, by the microflow routing module, a second flow to a second packet processing module of the microflow routing module via a second virtual port of the microflow routing module in response to determining that the second packet processing module is to be utilized to process the second flow;

processing the second flow using the second packet processing module; and directing the second flow to a destination associated with the second flow.

* * * * *